United States Patent [19]

Sasena

[11] 4,018,425
[45] Apr. 19, 1977

[54] FASTENER FOR FENCE CONSTRUCTION AND FENCING SYSTEM UTILIZING SAME

[75] Inventor: John J. Sasena, Parma, Ohio

[73] Assignee: Eaton Corporation, Cleveland, Ohio

[22] Filed: Dec. 15, 1975

[21] Appl. No.: 640,508

Related U.S. Application Data

[63] Continuation-in-part of Ser. No. 536,146, Dec. 24, 1974, Pat. No. 3,959,852.

[52] U.S. Cl. .............................. 256/54; 24/73 SM
[51] Int. Cl.² .......................................... B21F 27/00
[58] Field of Search ............ 248/62, 68; 24/73 SM, 24/73 B; 256/54

[56] References Cited

UNITED STATES PATENTS

| | | | |
|---|---|---|---|
| 1,360,375 | 11/1920 | Dammann | 256/54 |
| 2,863,625 | 12/1958 | Attwood | 248/68 R |
| 3,017,205 | 1/1962 | Williams | 248/68 R |
| 3,532,311 | 10/1970 | Havener | 248/62 R |

Primary Examiner—Werner H. Schroeder
Assistant Examiner—Doris L. Troutman
Attorney, Agent, or Firm—Teagno & Toddy

[57] ABSTRACT

A one-piece spring fastener is provided for mounting fencing wire or the like to a channel-shaped support. The wire is mounted at an oblique angle to the axis of the support and the wire is free to move along its axis relative to the support. The fastener includes a pair of spaced-apart T-shaped walls joined by a bight portion. The top portions of the T-shaped walls cooperate with the bight portion to define a trough for receipt of the wire. Each of the T-shaped walls includes a dart-shaped wall portion, the dart-shaped wall portions being generally parallel to each other and defining a plane oriented at the oblique angle relative to the associated top portion. The dart-shaped wall portions are configured to be forcibly received between the inturned flanges of the channel-shaped support and retained therebetween.

16 Claims, 8 Drawing Figures

FASTENER FOR FENCE CONSTRUCTION AND FENCING SYSTEM UTILIZING SAME

CROSS REFERENCE TO RELATED APPLICATION

This application is a Continuation-in-Part of U.S. application Ser. No. 536,146, filed Dec. 24, 1974 now U.S. Pat. No. 3,959,852, patented June 1, 1976.

BACKGROUND OF THE DISCLOSURE

The present invention relates to fasteners for attaching wires to supports, and more particularly, to spring fasteners for mounting fencing wires to channel-shaped fence supports. More specifically, the fastener of the present invention may be used to mount the wire at an oblique angle to the support, as is done in the case of "cyclone" fences.

The prior art discloses several fasteners for mounting elongated members such as a wire, a conduit, a pipe or the like, to a generally channel-shaped support. Examples of such prior art fasteners may be seen by reference to U.S. Pat. Nos. 1,360,375, 2,863,625 and 3,532,311.

The prior art fasteners have not been completely satisfactory, especially when utilized for mounting fencing wire to channel-shaped fencing supports, as the fasteners allowed considerable undesirable rotation of the wire relative to the support, prevented axial movement of the wire relative to the support, frequently required a rotational installation procedure and/or were not designed to be permanently mounted to the support member. As used herein, the term "permanently mounted" means that the wire is mounted to the support in such a manner that the wire can be disassembled from the support only by destroying, or at least damaging the fastener.

SUMMARY OF THE INVENTION

Accordingly, it is an object of the present invention to provide an improved fastener for mounting an elongated member, such as a fencing wire, to a channel-shaped support.

It is a more specific object of the present invention to provide such an improved fastener for mounting the wire at an oblique angle relative to the axis of the channel-shaped support.

It is a further object of the present invention to provide a fastener which achieves the above-stated objects and which is of one-piece construction, prevents rotation of the wire relative to the axis of the support and permits axial movement of the wire relative to the support.

The above and other objects are accomplished by the provision of a one-piece spring fastener for mounting a wire to a support member which has longitudinally-extending surfaces or flanges for receiving the fastener. The fastener comprises an elongated, generally U-shaped wire receiving portion including first and second side walls spaced apart a distance greater than the maximum diameter of the wire. A first connecting wall portion is disposed between the first side wall and a first dart-shaped wall portion and a second connecting wall portion is disposed between the second side wall and a second dart-shaped wall portion. The first and second dart-shaped wall portions are generally parallel and each is oriented at an oblique angle relative to its associated side wall.

In accordance with another aspect of the present invention, the U-shaped portion has a length L and first and second ends. The first dart-shaped wall portion defines a first minor axis disposed from the first end a distance less than L/2. The second dart-shaped wall portion defines a second minor axis disposed from the second end a distance less than L/2.

DESCRIPTION OF THE PREFERRED EMBODIMENT

Figure 1:
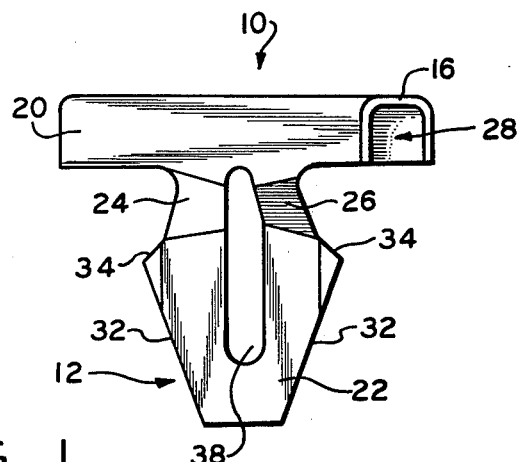
FIG. 1 is a front elevation view of the fastener of the present invention.
Figure 2:
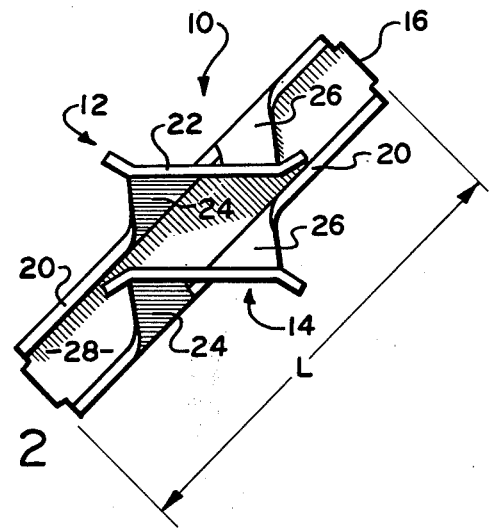
FIG. 2 is a bottom plan view of the fastener of the present invention.

Referring now to the drawings, which are not intended to limit the present invention, FIGS. 1 and 2 illustrate the fastener of the present invention, generally designated 10. The fastener 10 is a one-piece spring fastener, preferably stamped from spring steel, although the fastener may also be molded, such as from a resilient plastic material. The fastener 10 includes a pair of spaced apart, generally T-shaped wall portions 12 and 14 joined by a bight portion or interconnecting bridge portion 16. The T-shaped wall portions 12 and 14 are generally parallel, as will be described in greater detail subsequently, and the bight portion 16 extends generally perpendicularly therebetween.

The T-shaped wall portions 12 and 14 are substantially identical and, thus, only wall portion 12 will be described and referenced in detail. The T-shaped wall portion 12 includes a top portion 20 and a generally dart-shaped wall portion 22. Extending between the top portion 20 and dart-shaped wall portion 22 are a pair of interconnecting wall portions 24 and 26. The top portions 20, in combination with the bight portion 16, define a trough 28 for receiving a wire W (See FIG. 6). Preferably, the trough 28 has sufficient transverse dimensions to permit the wire W to be axially movable within the trough 28; for example, the top portions 20 of the T-shaped wall portions 12 are spaced apart by a distance greater than the maximum diameter of the wire W. Therefore, when the fastener 10 is assembled to a channel-shaped support member S (see FIG. 6), the dimensional relationship between the trough 28 and the wire W permits movement of the wire W along its axis relative to the support member S, such axial movement being important to allow the wire W to contract and expand in response to variations in temperature and the like.

Figure 6:
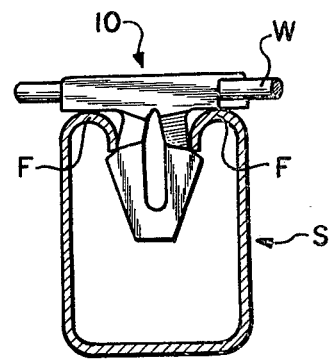
FIG. 6 is a horizontal cross-section of the fastener of the present invention mounting a wire to the support shown in FIG. 5.

The fastener 10 and bight portion 16 have a length L, measured along the axis of the wire W, and preferably, this length L is sufficient to permit the underside of top portions 20 to engage each of a pair of inwardly-turned flanges F of support member S, as shown in FIG. 6.

Referring again to FIGS. 1 and 2, it will be noted that each of the dart-shaped wall portions 22 are oriented at an oblique angle relative to the top portion 20 to which it is connected, for reasons which will be described subsequently.

Each of the dart-shaped wall portions 22 includes a pair of edge surfaces 32 tapering outwardly in a direction toward the top portion 20, and each of the edge surfaces 32 terminates at a shoulder surface 34. Preferably, each of the T-shaped wall portions 12 includes one or more cutout portions, or slots 38, which permit resilient, inward deflection of the wall portion 12, to facilitate installation of the fastener in a manner to be described.

Figure 3:
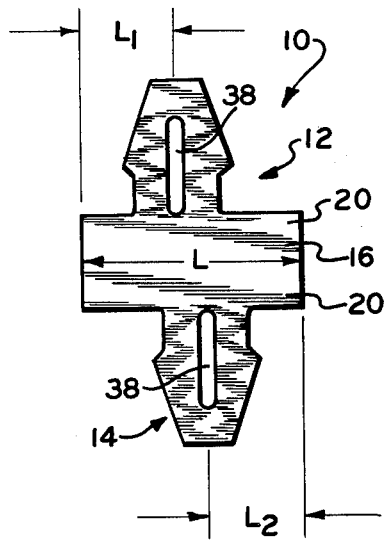
FIGS. 3 and 4 illustrate stages in the forming of the fastener of FIGS. 1 and 2.
Figure 4:
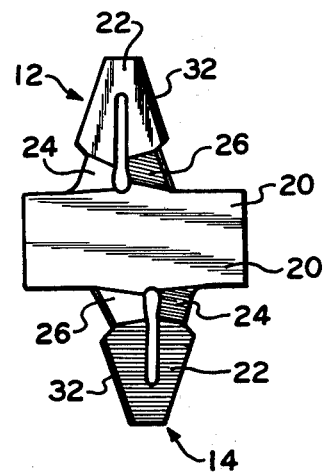

Referring now to FIGS. 3 and 4, there is illustrated several stages in the forming of the fastener 10, typically, by means of a progressive die. In FIG. 3, the fastener 10 is shown as it is initially stamped with the entire fastener 10 being one flat, planar piece. It will be noted that the bight portion 16 and top portions 20 comprise a rectangle, before being formed into the general U-shape configuration best shown in FIG. 1. This flat rectangle has the length L along its axis, and each of the T-shaped wall portions 12 and 14 define a minor axis oriented generally perpendicular to the axis of the rectangular portion. In order to facilitate the forming of the fastener 10 into the configuration shown in FIG. 2, it has been found desirable to offset each of the T-shaped wall portions 12 and 14 in a manner shown in FIG. 3. Therefore, the axis of wall portion 12 is separated from the adjacent end of the rectangular portion by a distance $L_1$ while the axis of the wall portion 14 is separated from the opposite end by a distance $L_2$. It will be appreciated that for certain configurations of the fastener 10 one of the distances $L_1$ or $_2$ could be greater than L/2, thus placing both of the T-shaped wall portions 12 and 14 nearer to one end of the fastener 10 than to the other end, but typically, the T-shaped wall portions 12 and 14 are centered relative to the trough 28. It will also be apparent that $L_1$ and $L_2$ are not necessarily equal, although in FIG. 3, $L_1$ and $L_2$ are approximately equal and each is greater than L/4, but less than L/2.

Referring now to FIG. 4, there is illustrated the second stage in the forming of fastener 10. Each of the dart-shaped wall portions 22 is bent to an oblique angle relative to its associated top portion 20, the wall portion 22 of T-shaped wall portion 12 being bent in one direction relative to the plane of FIG. 4, and the dart-shaped wall portion 22 of T-shaped wall portion 14 being bent in the opposite direction relative to the plane of FIG. 4. It is during this stage of the forming that the interconnecting wall portions 24 and 26 cease to be planar with the associated dart-shaped wall portion 22 and top portion 20. Thus, as shown in FIG. 4, each of the interconnecting wall portions 26 may be considered as extending or rising out of a plane containing top portion 20, while each of the interconnecting wall portions 24 and 26 may be considered as extending downward from the plane of the associated top portion 20. The final forming stage for the fastener 10 comprises bending the rectangular portion to the configuration illustrated in FIGS. 1 and 2, thereby delineating bight portion 16 and top portions 20. It is believed that the relative orientation of the interconnecting walls 24 and 26 to the dart-shaped wall portions 22 may be seen best in the bottom plan view of FIG. 2. It will be noted in FIG. 2 that the vertical axis defined by each of the dart-shaped wall portions 22 passes approximately through the plane of the top portions 20. Also, in FIG. 2 it will be seen that the oblique angle defined by each of the dart-shaped wall portions 22 and its associated top portion 20 is in the range of about 40° to about 50°, and, more specifically, is about 45° in the subject embodiment.

Figure 5:
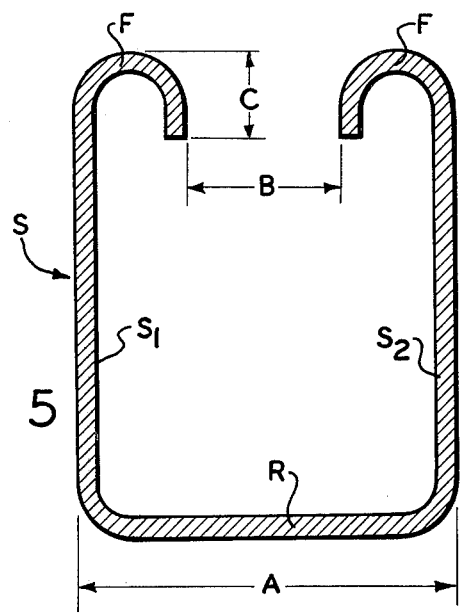
FIG. 5 is a horizontal cross-section through a channel-shaped support of the type with which the fastener of the present invention is utilized.

The channel-shaped support member S has its cross-sectional configuration illustrated in FIG. 5. The support member S is a one-piece structure which may be extruded or rolled in continuous lengths and then cut to the desired size. The support member S comprises a pair of generally parallel sides, $S_1$ and $S_2$, a rear R which is generally perpendicular to the sides $S_1$ and $S_2$, and a pair of inturned flanges F extending from the front edges of sides $S_1$ and $S_2$. The rear R is of a substantially constant width A and the inturned flanges F are separated by a substantially constant distance B, measured parallel to the rear R. Each inturned flange F extends rearwardly a distance C.

Figure 7:
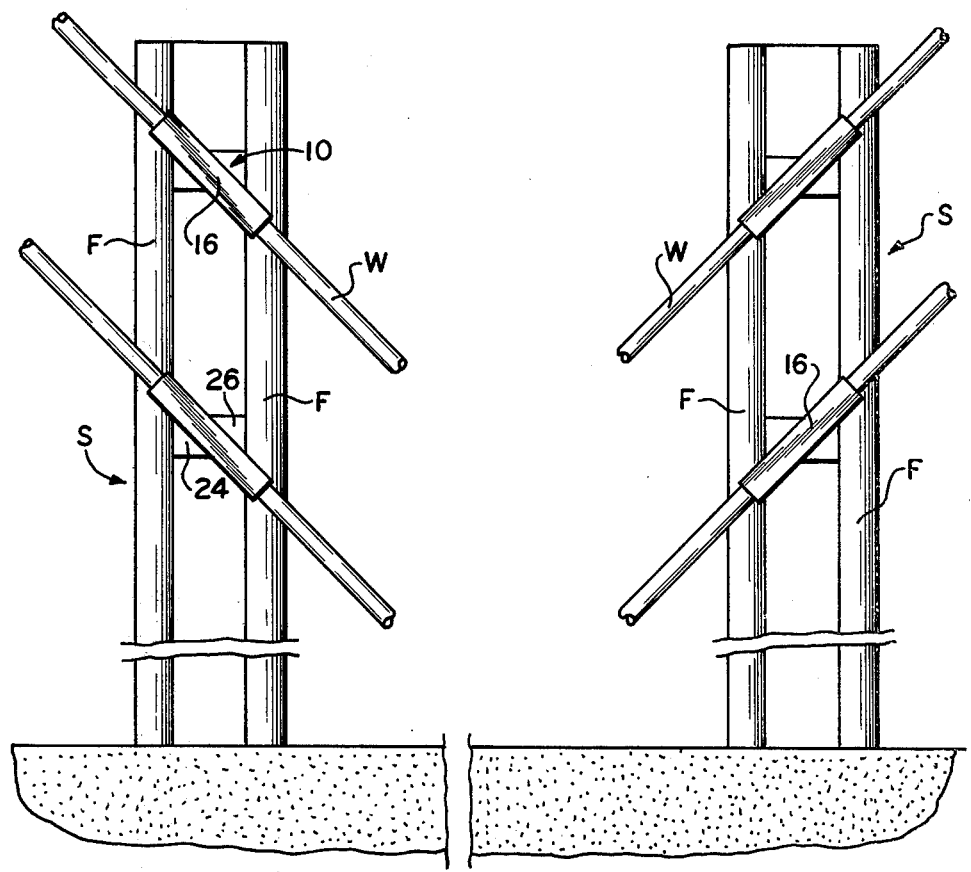
FIG. 7 is a somewhat schematic, fragmentary elevation view of a fencing system utilizing the fastener of the present invention.

FIGS. 6 and 7 illustrate the fastener 10 permanently installed on the support member S, mounting a wire W at an oblique angle relative to the axis of the support S. As may be best seen in FIG. 6, the outer edges of interconnecting wall portions 24 and 26 are separated by a distance approximately equal to distance B between the inturned flanges F. The shoulders 34 are spaced from the bottom edges of top portions 20 by a distance substantially equal to the rearward extension C of the inturned flanges F for relatively permanent retention of the fastener 10 by the flanges. The length L of the fastener 10 is shown as being substantially equal to the width A of the support member S such that with the top portions 20 of the fastener 10 oriented at the oblique angle, relative to the axis of the support member S, the undersides of top portions 20 are at least able to engage the outer surfaces of the inturned flanges F.

Figure 8:
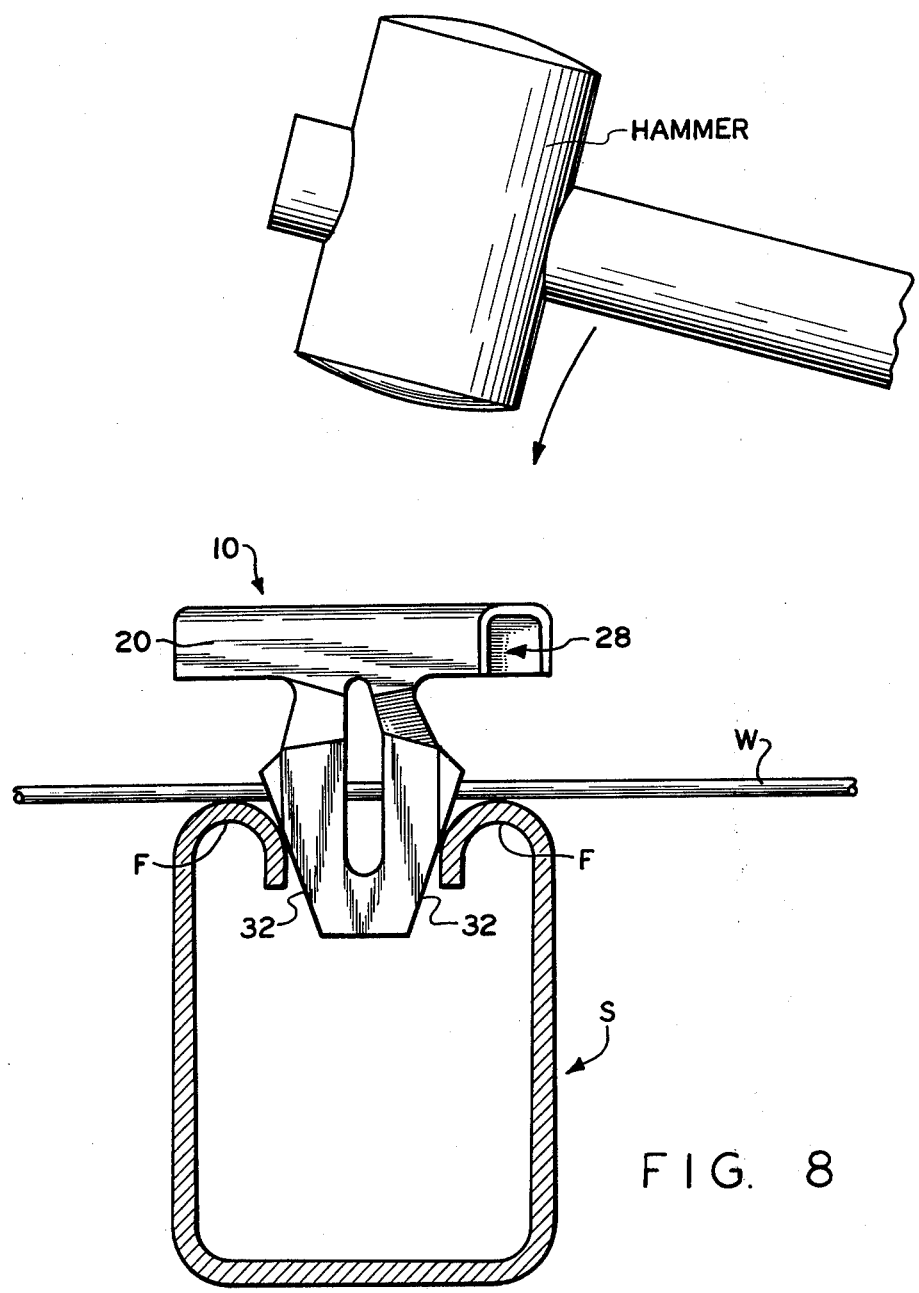
FIG. 8 is a view of the fastener being permanently installed into the channel-shaped support.

Referring now to FIG. 8, in conjunction with FIG. 7, there is shown the assembly of a fencing system utilizing a plurality of the support members S, and a plurality of the fasteners 10, each mounting one of the wires W at an oblique angle relative to the axis of the support member S. The wire W is laid across the outer surface of the inturned flanged F of the support member S which has been driven into the ground. The fastener 10 is then placed in the position shown in FIG. 8 with the wire W disposed between the T-shaped wall portions 12 and 14, and with the edge surfaces 32 engaging the inturned flanges F. A sharp hammer blow to the bight portion 16 will cause the edge surfaces 32 to be resiliently deformed inwardly as the top portions 20 are driven toward the support member S. When the undersides of the top portions 20 contact the outer surfaces of the flanges F, the edge surfaces 32 will have cleared the flanges F and resiliently return to their undeformed positions, and the shoulders 34 will engage the inward ends of the flanges F, permanently installing the fasteners 10 to the support member S as shown in FIG. 6.

I claim:

1. A one-piece spring fastener for mounting a wire to a channel-shaped support having inturned flanges to orient the wire at an oblique angle to the support, the wire having a maximum diameter and being mounted by said fastener for axial movement relative to the support, said fastener comprising;

a. a pair of spaced-apart, generally T-shaped wall portions;
b. a bight portion joining said T-shaped wall portions along substantially the entire length thereof and extending generally perpendicularly therebetween;
c. each of said T-shaped wall portions including a top portion contiguous with said bight portion, a generally dart-shaped wall portion, and an intermediate wall portion connecting said top portion and said dart-shaped wall portion;
d. said top portions being generally parallel and cooperating with said bight portion to define a trough for receiving the wire therein;
e. said dart-shaped wall portions being generally parallel and each of said dart-shaped wall portions defining a plane oriented at said oblique angle relative to its associated top portion; and
f. each of said dart-shaped wall portions being configured to be forcibly received therebetween the inturned flanges of the channel-shaped support and retained therebetween.

2. A fastener as claimed in claim 1 wherein said top portions are spaced from each other a distance greater than said maximum diameter of the wire.

3. A fastener as claimed in claim 1 wherein each of said dart-shaped wall portions includes a pair of edges tapering outwardly in a direction toward said top portion and terminating in a pair of shoulders, said shoulders, at the outermost extremity thereof being separated by a distance greater than the separation between the inturned flanges of the support.

4. A fastener as claimed in claim 1 wherein said oblique angle is in the range of about 40° to about 50°.

5. A fastener as claimed in claim 1 wherein each of said generally dart-shaped wall portions defines a vertical axis, said top portions defining first and second fastener ends and having a length L along the axis of the wire, one of said vertical axes is disposed from said first fastener a distance less than L/2.

6. A fastener as claimed in claim 5 wherein the other of said vertical axes is disposed from said second fastener a distance less than L/2.

7. A fastener as claimed in claim 1 wherein each of said generally dart-shaped wall portions defines a vertical axis and is generally symmetrical about said vertical axis, each of said vertical axes lying approximately in a plane defined by its associated top portion.

8. A support and fastener assembly for mounting a wire having a maximum diameter, restraining the wire from substantial transverse movement, while permitting axial movement of the wire, said assembly comprising:
   a. a channel-shaped support including a pair of parallel side walls, means rigidly interconnecting said side walls, and an inwardly turned flange extending from the forward extremity of each of said side walls;
   b. a one-piece fastener including a pair of spaced apart, generally T-shaped wall portions, a bight portion joining said T-shaped wall portions, each of said T-shaped wall portions having a top portion contiguous with said bight portion and a generally dart-shaped wall portion extending from said top portion, said dart-shaped wall portions being generally parallel and each of said dart-shaped wall portions being configured to be forcibly received between said inwardly turned flanges and retained therebetween with said dart-shaped wall portions oriented generally perpendicular to the longitudinal axis of said channel-shaped support, said top portions being generally parallel and cooperating with said bight portion to define a trough for receiving the wire therein, each of said top portions defining a plane oriented at an oblique angle to the plane of the respective dart-shaped wall portion to mount the wire, relative to the longitudinal axis of said support, at the complementary angle of said oblique angle.

9. A support and fastener assembly as claimed in claim 8 wherein said oblique angle is in the range of about 40° to about 50°.

10. A one-piece spring fastener for mounting a wire to a support member having longitudinally-extending surfaces for receiving said fastener to orient the wire at an oblique angle to the longitudinal axis of the support, the wire having a maximum diameter and being mounted by said fastener for axial movememt relative to the support, said fastener comprising:
   a. an elongated, generally U-shaped wire receiving portion, including first and second side walls spaced apart a distance greater than said maximum diameter of the wire;
   b. first and second generally dart-shaped wall portions;
   c. first and second connecting wall portions, said first connecting wall portion disposed between said first side wall and said first dart-shaped wall portion and contiguous therewith, said second connecting wall portion disposed between said second side wall and said second dart-shaped wall portion and contiguous therewith;
   d. said first and second dart-shaped wall portions being generally parallel and defining respectively, first and second axially extending centerlines oriented generally perpendicular to the bottom surface of said U-shaped portion;
   e. said U-shaped portion having a length L and first and second ends;
   f. said first axially extending centerline disposed from said first end a distance less than L/2 and said second axially extending centerline disposed from said second end a distance less than L/2.

11. A fastener as claimed in claim 10 wherein said first axially extending centerline lies approximately in a plane defined by said first side wall and said second axially extending centerline lies approximately in a plane defined by said second side wall.

12. A fastener as claimed in claim 10 wherein each of said dart-shaped wall portions defines a plane oriented at the complementary angle of said oblique angle relative to its respective side wall.

13. A fastener as claimed in claim 10 wherein said first axially extending centerline is disposed from said first end a distance $L_1$ and said second axially extending centerline is disposed from said second end a distance $L_2$, each of said distances $L_1$ and $L_2$ being greater than L/4 and less than L/2.

14. A thin, generally flat member adapted to be formed into a one-piece spring fastener for mounting a wire to a channel-shaped support at an oblique angle to the support, said flat member comprising:
   a. an elongated, generally rectangular wall portion, having oppositely disposed first and second end edges and oppositely disposed first and second side edges;

b. said generally rectangular wall portion having a length L along its longitudinal axis and being adapted to be formed into a generally U-shaped wire receiving portion;
c. first and second generally dart-shaped wall portions extending, respectively, from said first and second side edges and being contiguous therewith;
d. said first and second dart-shaped wall portions defining, respectively, first and second axially extending centerlines, oriented generally perpendicular to said longitudinal axis of said longitudinal axis of said rectangular wall portion;
e. said first axially extending centerline being disposed from said first end edge a distance less than L/2 and said second axially extending centerline being disposed from said second end edge a distance less than L/2.

15. A generally flat member as claimed in claim 14 wherein said first axially extending centerline is disposed from said first end edge and said second axially extending centerline is disposed from said second end edge a distance $L_1$, said distance $L_1$ being greater than L/4 and less than L/2.

16. A generally flat member as claimed in claim 14 wherein each of said generally dart-shaped wall portions defines an elongated slot extending along the respective minor axis and being generally symmetrical thereabout to permit said dart-shaped wall portion to be forcibly and deformably inserted into the channel-shaped support, oriented generally perpendicular to the axis of the support.

* * * * *

UNITED STATES PATENT AND TRADEMARK OFFICE
CERTIFICATE OF CORRECTION

PATENT NO. : 4,018,425
DATED : April 18, 1977
INVENTOR(S) : John J. Sasena

It is certified that error appears in the above-identified patent and that said Letters Patent are hereby corrected as shown below:

Col. 3, line 37: "$L_1$ or $_2$" should read ---$L_1$ or $L_2$---.

Col. 4, line 61: "fasteners" should read ---fastener---.

Col. 5, line 19: "therebetween" should read ---between---.

Signed and Sealed this fifth Day of July 1977

[SEAL]

Attest:

RUTH C. MASON
*Attesting Officer*

C. MARSHALL DANN
*Commissioner of Patents and Trademarks*